Figures 1, 2:
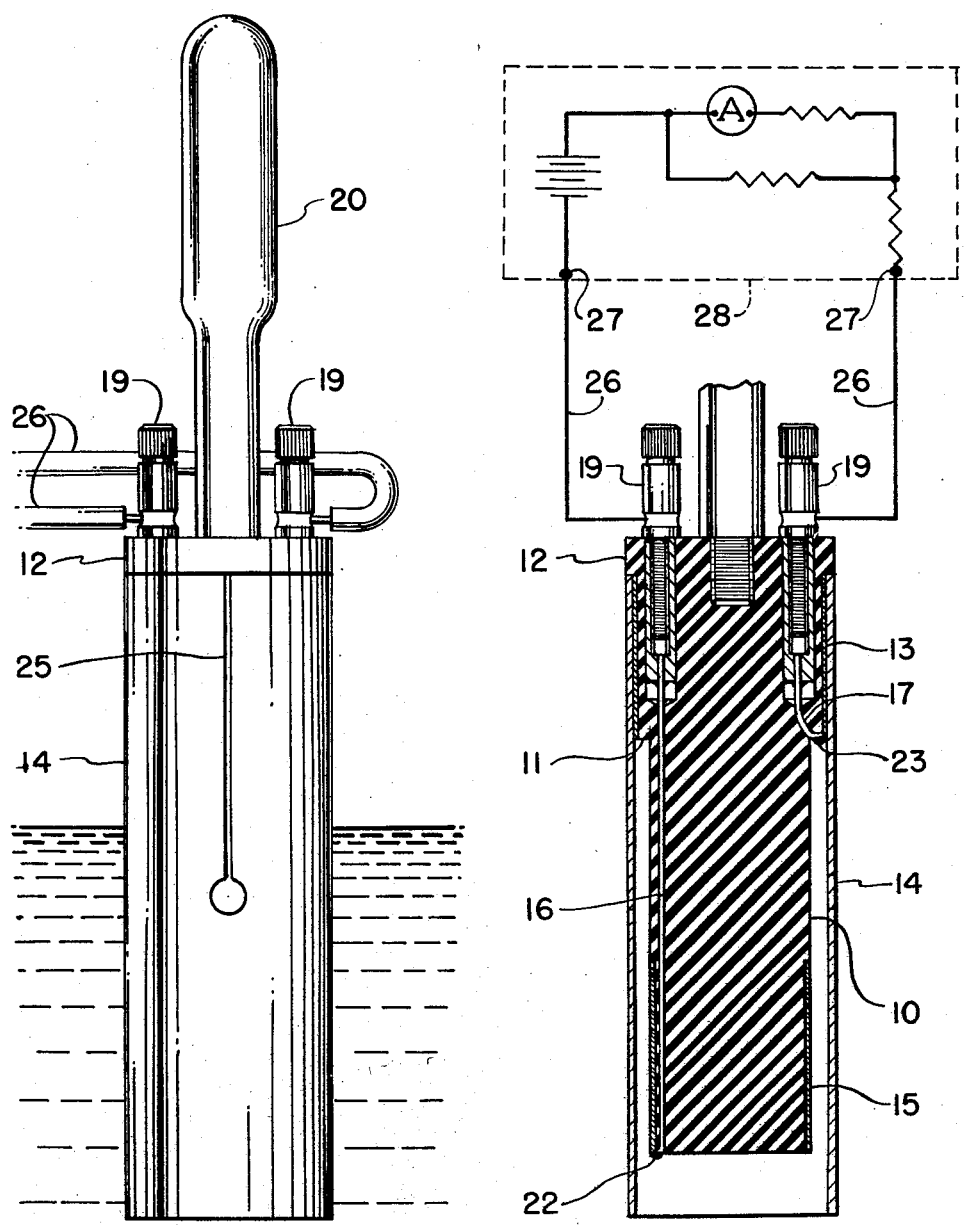

March 19, 1963 W. D. GAUTHIER 3,082,372
APPARATUS FOR TESTING ELECTRICAL RESISTIVITY OF LIQUIDS
Filed April 20, 1959

INVENTOR.
William D. Gauthier
BY Harry E. Downer
Attorneys

3,082,372
APPARATUS FOR TESTING ELECTRICAL RESISTIVITY OF LIQUIDS

William D. Gauthier, Indianapolis, Ind., assignor to Ransburg Electro-Coating Corp., Indianapolis, Ind., a corporation of Indiana
Filed Apr. 20, 1959, Ser. No. 807,514
7 Claims. (Cl. 324—30)

In electrostatic spray coating systems a factor of some significance in certain situations is the electrical resistivity of the paint or other coating material being employed. This invention deals with a portable, simple, low-cost, but effective device for measuring the electrical resistivity of paint and other liquids in the field.

The invention is directed primarily to the arrangement and mounting of spaced electrodes adapted to be immersed in a body of the liquid being tested and to be connected electrically with an ohmmeter. In the preferred arrangement, the electrode assembly comprises a generally cylindrical body of insulating material adapted to support two concentric, radially spaced, annular electrodes. Conveniently, the insulating body has an enlarged head at its upper end, to which there is affixed an annular metal sleeve having a slip fit within the outer of the two electrodes. Below such head, the insulating body continues downwardly within and in radially spaced relation to the outer electrode, and the inner electrode is mounted at the lower end of the body, conveniently by having a press fit thereon. Mounted on the enlarged head of the body are a handle and a pair of binding posts, the latter connected respectively to the aforesaid metal sleeve and inner electrode. Flexible conductors connect the binding posts to an ohmmeter of any suitable form.

To operate the device, the electrode assembly, held by the handle, is immersed in a vertical position into a body of the liquid to be tested to a depth sufficient to insure complete submergence of the inner electrode, and the reading of the ohmmeter will then measure the resistivity of the liquid. To provide for this escape of air which, if not vented, would prevent the entry of the liquid into the annular space between the electrodes, the outer electrode may be provided with a vent opening, which may also serve as an indication of the proper immersion-depth.

Other features of the invention will become apparent from the following more detailed description and from the accompanying drawings, in which:

FIG. 1 is a side elevation of the electrode assembly immersed in a body of liquid in testing position; and FIG. 2 is an axial section through the electrode assembly showing its connection to an ohmmeter.

The device illustrated in the drawing comprises a cylindrical body 10 of insulating material having an enlarged head 11 provided at its upper end with a further enlarged flange 12. A sleeve 13 of conducting material is secured to the head 11, conveniently by having a press fit thereon. Fitting over the sleeve 13 is the outer electrode 14 which has a tubular form and which extends downwardly in radially spaced relation to the body 10 to, and preferably somewhat beyond, the lower end of such body. Secured to the lower end of the body 10, conveniently by having a press fit thereon, is the tubular inner electrode 15. The body 10 is provided with longitudinally extending passages which receive conductors 16 and 17 through which the outer and inner electrodes are respectively connected to binding posts or other terminals 19 mounted on the outer face of the flange 12. To facilitate use of the device, a handle 20 may be attached to the body 10.

The passage containing the conductor 16 may extend to the lower end of the body 10 to expose the end of such conductor and permit its effective electrical connection to the inner electrode 15, as by the soldering indicated at 22. Similarly, the passage containing the conductor 17 may open in the annular shoulder marking the lower end of the head 11 so that the conductor can be united by soldering 23 to the sleeve 13.

To facilitate cleaning of the device the outer electrode 14 is preferably made readily removable, as by having a slip fit on the sleeve 13. In order to facilitate the provision of a proper fit and to permit the use of standard sizes of tubing, the upper end of the outer electrode 14 may be provided with one or more slots 25 extending axially of the device to a point below the lower end of the head 11 but terminating short of the inner electrode 15. The diameters of the sleeve 13 and outer electrode 14 are such that the upper end of the outer electrode must be spread slightly, as permitted by the slot or slots 25, to permit it to receive the sleeve 13, which it will thereafter grip resiliently. That portion of each slot 25 extending below the head 11 constitutes an air vent permitting the escape of air when the device, in vertical position, is lowered into the liquid being tested.

Flexible conductors 26 connect the binding posts 19 to the terminals 27 of an ohmmeter 28. Such ohmmeter may be of any desired type suitable to measure the resistance to radial current flow of the annular body of liquid confined between the outer and inner electrodes 14 and 15.

In using the device, the conductors 26 are connected to the binding post 19 and terminals 27, and the device is immersed in vertical position into the liquid to occupy the approximate position illustrated in FIG. 1. As the device enters the liquid, the air displaced from the annular space between the two electrodes is vented through the slots 25. If, as is preferred, the slots 25 terminate a substantial distance above the upper end of the inner electrode 15, the lower end of each slot will serve to provide a measure of the proper depth of immersion. That is, if the operator immerses the device until the liquid level is above the lower end of the slot, he will thus insure that the annular space between the electrodes 14 and 15 is completely filled with liquid for its entire axial extent. With the device positioned as indicated in FIG. 1, the ohmmeter 28 will measure the resistance to radial flow of current between the outer and inner electrodes 14 and 15. As the body of liquid conveying the current has fixed dimensions, the indicated resistance will be a measure of resistivity of the liquid.

It will be noted that during the testing operation the body of liquid conveying current is isolated, by its containment within the outer electrode and by the projection of the outer electrode below the inner electrode, from the walls of the vessel containing the liquid. In the absence of such isolation, electrical conductivity of the vessel wall and the size and shape of the vessel and the proximity of the electrode to the vessel wall might affect the ohmmeter reading. Exact concentricity of the two electrodes is relatively immaterial, since the shortening of one portion of the current path occasioned by any eccentricity would be offset by the lengthening of the diametrically opposite portion of the current path. The device provides for a current-conveying body of liquid of relatively large cross-section and short effective (radial) length. As a result, the resistance of the current-conducting body is relatively low and the measurement of resistance is not seriously affected by any stray current such as might pass over the surface of the body 10. Thus relatively insensitive and inexpensive ohmmeters may be used with this device. The ready removability of the outer electrode 14 facilitates cleaning of the device.

I claim:
1. In a portable device for use in measuring the resistivity of a liquid coating material, a generally cylindrical, vertically extending body of insulating material, an electrode connected to the upper portion of said body having an outer tubular portion spaced radially outwardly from at least a portion of said body and extending axially downward to a point below the lower end of said body, an inner electrode mounted concentrically on said body adjacent the lower end thereof, said inner electrode being above the lower end of said outer electrode portion and having its upper end spaced downwardly from the upper end of said body, both dimensions of the surface of said inner electrode exposed to said outer electrode being many times the radial gap between said inner and outer electrodes, said inner electrode and said outer electrode portion defining an annular liquid receiving space open at its lower end, and terminals electrically connected to said outer and inner electrodes, said device being provided with a vent opening for venting air from said annular liquid receiving space as the device in an upright position is lowered into the liquid coating material.

2. A device as set forth in claim 1 with the addition that said outer electrode portion is axially withdrawable from said device.

3. A device as set forth in claim 1 with the addition that said outer electrode portion is removable from association with the balance of the device by downward withdrawal therefrom, said body being provided with a head at its upper end providing an abutment limiting relative upward movement of said outer electrode portion when it is reapplied.

4. A device as set forth in claim 1 with the addition of an electroconductive sleeve portion secured to the upper end of said body and in contact with said outer electrode, one of said terminals being connected with said sleeve portion.

5. A device as set forth in claim 4 with the addition that the upper end of said outer electrode portion is provided with one or more axially extending slots to increase its resilience and permit it to grip said sleeve, said slots terminating at their lower ends above the upper end of said inner electrode.

6. A device as set forth in claim 4 with the addition that the upper end of said outer electrode portion is provided with one or more axially extending slots to increase its resilience and permit it to grip said sleeve.

7. A device as set forth in claim 1 with the addition that said body is provided with an axially extending passage opening in the lower end face of the body, a conductor occupying said passage to its lower end for electrically connecting one of said terminals to said inner electrode.

References Cited in the file of this patent

UNITED STATES PATENTS

| | | |
|---|---|---|
| 1,524,937 | Keeler | Feb. 3, 1925 |
| 2,616,949 | Cade | Nov. 4, 1952 |
| 2,654,862 | Petersen | Oct. 6, 1953 |